United States Patent
Arimilli et al.

(10) Patent No.: US 6,347,363 B1
(45) Date of Patent: Feb. 12, 2002

(54) MERGED VERTICAL CACHE CONTROLLER MECHANISM WITH COMBINED CACHE CONTROLLER AND SNOOP QUERIES FOR IN-LINE CACHES

(75) Inventors: Ravi Kumar Arimilli, Austin; John Steven Dodson, Pflugerville; Jerry Don Lewis, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/024,316

(22) Filed: Feb. 17, 1998

(51) Int. Cl.⁷ .......................... G06F 12/08; G06F 12/12
(52) U.S. Cl. ..................... 711/150; 711/122; 711/138; 711/168; 711/146
(58) Field of Search ...................... 711/122, 117, 711/138, 168, 150, 146, 140, 131; 712/205

(56) References Cited

U.S. PATENT DOCUMENTS

| | | | | |
|---|---|---|---|---|
| 5,706,464 A | * | 1/1998 | Moore et al. ............... | 711/122 |
| 5,787,459 A | * | 7/1998 | Stallmo et al. ............. | 711/112 |
| 5,805,905 A | * | 9/1998 | Biswas et al. .............. | 710/244 |
| 5,822,559 A | * | 10/1998 | Narayan et al. ............. | 712/214 |
| 5,826,052 A | * | 10/1998 | Stiles et al. ................ | 712/205 |
| 5,848,432 A | * | 12/1998 | Hotta et al. ................ | 711/131 |
| 5,860,086 A | * | 1/1999 | Crump et al. ............... | 711/123 |
| 5,860,159 A | * | 1/1999 | Hagersten ................... | 711/151 |
| 5,875,463 A | * | 2/1999 | Crump et al. ............... | 711/123 |
| 5,903,908 A | * | 5/1999 | Singh et al. ................ | 711/122 |
| 5,913,226 A | * | 6/1999 | Sato .......................... | 711/146 |
| 6,021,471 A | * | 2/2000 | Stiles et al. ................ | 711/140 |
| 6,065,098 A | * | 5/2000 | Lippert ...................... | 711/122 |

* cited by examiner

Primary Examiner—Matthew Kim
Assistant Examiner—Brian R. Peugh
(74) Attorney, Agent, or Firm—Volel Emile; Bracewell & Patterson, L.L.P.

(57) ABSTRACT

Logically in line caches within a multilevel cache hierarchy are jointly controlled by single cache controller. By combining the cache controller and snoop logic for different levels within the cache hierarchy, separate queues are not required for each level. During a cache access, cache directories are looked up in parallel. Data is retrieved from an upper cache if hit, or from the lower cache if the upper cache misses and the lower cache hits. LRU units may be updated in parallel based on cache directory hits. Alternatively, the lower cache LRU unit may be updated based on cache memory accesses rather than cache directory hits, or the cache hierarchy may be provided with user selectable modes of operation for both LRU unit update schemes. The merged vertical cache controller mechanism does not require the lower cache memory to be inclusive of the upper cache memory. A novel deallocation scheme and update protocol may be implemented in conjunction with the merged vertical cache controller mechanism.

16 Claims, 4 Drawing Sheets

MERGED VERTICAL CACHE CONTROLLER MECHANISM WITH COMBINED CACHE CONTROLLER AND SNOOP QUERIES FOR IN-LINE CACHES

RELATED APPLICATIONS

The present invention is related to the subject matter of commonly assigned, copending U.S. patent application Ser. No. 09/024,317 entitled "Deallocation with Cache Update Protocol (L2 Evictions)" and filed, Feb. 17, 1998, the content of which is incorporated herein by reference.

BACKGROUND OF THE INVENTION

1. Technical Field

The present invention relates in general to multilevel cache hierarchies in data processing systems and in particular to cache directory, controller, and snoop logic for multilevel cache hierarchies. Still more particularly, the present invention relates to vertical integration of cache directory, controller, and snoop logic for multilevel cache hierarchies in data processing systems.

2. Description of the Related Art

Most contemporary data processing system architectures include multiple levels of cache memory within the storage hierarchy. Caches are employed in data processing systems to provide faster access to frequently used data over access times associated with system memory, thereby improving overall performance. When utilized, multiple cache levels are typically employed in progressively larger sizes with a trade off to progressively longer access latencies. Smaller, faster caches are employed at levels within the storage hierarchy closer to the processor or processors, while larger, slower caches are employed at levels closer to system memory. Caches at any level may be private (reserved for a local processor) or shared (accessible to multiple processors), although typically caches at levels closer to the processors are private.

Level one (L1) caches, those logically closest to the processor, are typically implemented as an integral part of the processor and may be bifurcated into separate instruction and data caches. Lower level caches are generally implemented as separate devices, although a level two (L2) may be formed within the same silicon die as a processor. At all levels, however, caches generally include a number of common components: a cache directory, cache controller logic, logic implementing the cache replacement policy, and, in multiprocessor systems, snoop logic for detecting system bus operations which affect data within the cache. A block diagram of a typical cache configuration is depicted in FIG. 4. An L2 cache 402 includes directory (DIR) logic 404, a least-recently-used (LRU) replacement unit 406, a cache controller (C.C.) 408, snoop logic 410, and cache memory 412. Where a multilevel cache hierarchy is implemented with other caches logically in line with a cache such as L2 cache 402, generally the designs of specific cache components are reused for the other cache levels. For example, a level three (L3) cache 414 may be implemented by duplicating the design of L2 directory logic 404 for L3 directory logic 416, duplicating the design of L2 LRU unit 406 for L3 LRU unit 418, duplicating the design of L2 cache controller 408 for L3 cache controller 420, and duplicating design of L2 snoop logic 410 for L3 snoop logic 422. A larger cache memory 424 may be implemented for L3 cache 414.

The duplication of cache components requires a great deal of logic and a correspondingly large amount of silicon. Duplicate cache controllers 408 and 420 and duplicate snoop logic 410 and 422 in particular increases the amount of logic required since these components include a number of queues. For example, cache controllers 408 and 420 may include ten queues each, while snoop logic 410 and 422 may include four queues each. Most logic density within typical cache component design is based on the necessity for queues, providing a machine for each queue. Reducing the number of queues reduces the logic density, but also reduces performance.

Vertical cache implementations with duplicated logic also carry an associated latency. Data for a given instruction is first looked up in L2 cache 402; if missed in L2 cache 402, then the operation is presented to L3 cache 414 to determine if the required data is there. Absent additional levels in the cache hierarchy, a miss in L3 cache 414 results in a bus operation to access the data within system memory. Each effort to locate the required data within the storage hierarchy has an associated latency, which aggregate as each miss occurs.

A third problem with duplication of cache controller and snoop logic components for logically in line caches is that copying L2 designs for the L3 would require inclusivity unless the L3 is specially modified to avoid inclusivity. Most vertical cache configurations are inclusive, with the lower level, larger cache including the same data found in the higher level, smaller cache. This is less efficient than configurations in which a cache entry need not be found within both caches in the vertical hierarchy.

It would be desirable, therefore, to provide a vertical cache hierarchy configuration which reduces access latency to lower cache levels within the storage hierarchy and to system memory. It would further be advantageous if the multilevel cache hierarchy configuration reduces the logic density required for cache controllers and snoop logic for logically in line caches, and does not require inclusivity between vertical levels of a cache hierarchy.

SUMMARY OF THE INVENTION

It is therefore one object of the present invention to provide an improved multilevel cache hierarchy for data processing systems.

It is another object of the present invention to provide improved cache directory, controller, and snoop logic for multilevel cache hierarchies in data processing systems.

It is yet another object of the present invention to provide vertically integrated cache directory, controller, and snoop logic for multilevel cache hierarchies in data processing systems.

The foregoing objects are achieved as is now described. Logically in line caches within a multilevel cache hierarchy are jointly controlled by single cache controller. By combining the cache controller and snoop logic for different levels within the cache hierarchy, separate queues are not required for each level. Fewer total sets of queues results in consumption of less silicon area, higher frequency operation and improved performance. During a cache access, cache directories are looked up in parallel. Data is retrieved from an upper cache if hit, or from the lower cache if the upper cache misses and the lower cache hits. Because the directories are looked up in parallel, access latency to the lower level cache is reduced, as is access latency to system memory if all cache levels miss. LRU units may be updated in parallel based on cache directory hits, providing a more precise least-recently-used replacement policy for the total cache space. Alternatively, the lower cache LRU unit may be updated based on cache memory accesses rather than cache directory hits, or the cache hierarchy may be provided with user selectable modes of operation for both LRU unit update schemes. The merged vertical cache controller mechanism does not require the lower cache memory to be inclusive of the upper cache memory, thus improving cache efficiency since the same entry need not be stored in both. A novel deallocation scheme and update protocol may be implemented in conjunction with the merged vertical cache controller mechanism for further performance improvements.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
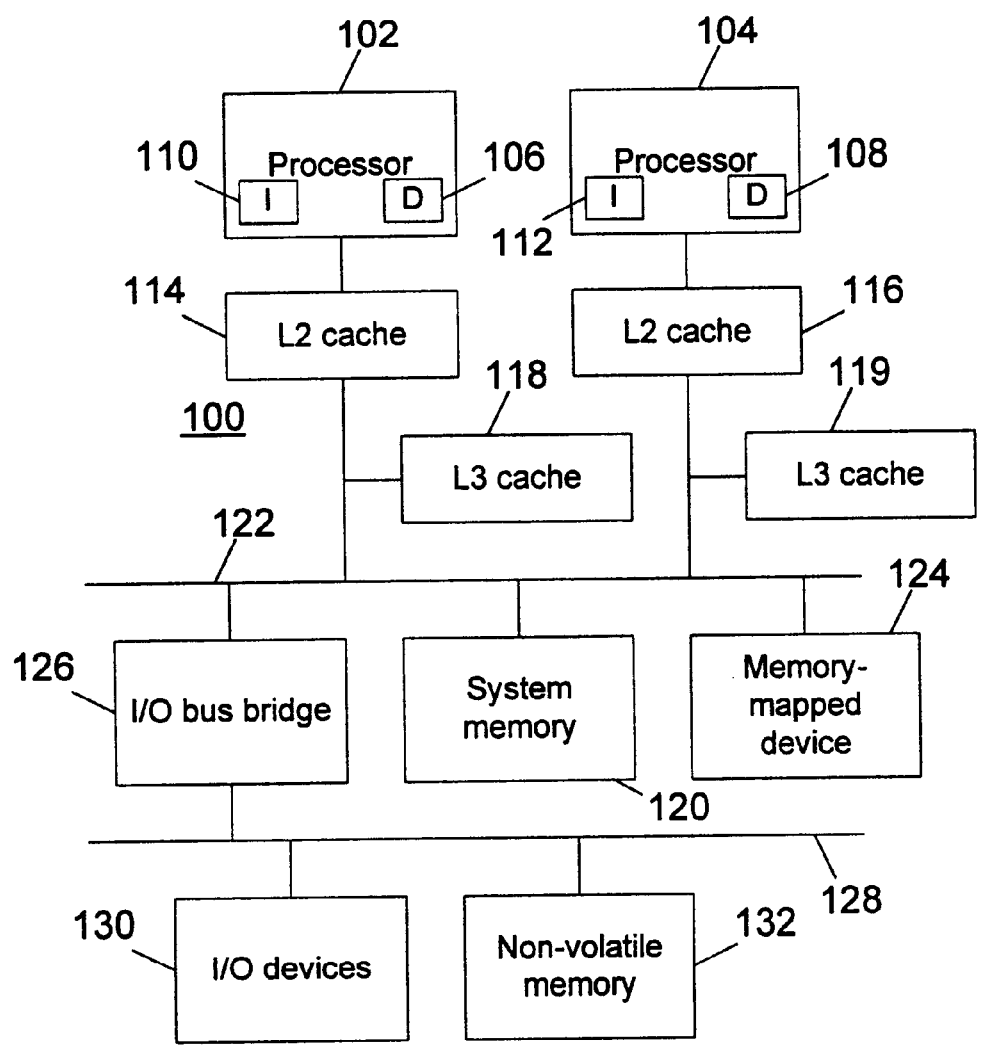
FIG. 1 depicts a multiprocessor data processing system in accordance with a preferred embodiment of the present invention.

With reference now to the figures, and in particular with reference to FIG. 1, a multiprocessor data processing system in accordance with a preferred embodiment of the present invention is depicted. Data processing system 100 is a symmetric multiprocessor (SMP) system including a plurality of processors 102 and 104, which preferably comprise one of the PowerPC ™ family of processors available from International Business Machines of Armonk, N.Y. Although only two processors are depicted in the exemplary embodiment, those skilled in the art will appreciate that additional processors may be utilized in a multiprocessor data processing system in accordance with the present invention.

Each processor 102 and 104 includes a level one (L1) data cache 106 and 108, respectively, and an L1 instruction cache 110 and 112, respectively. Although illustrated as bifurcated instruction and data caches in the exemplary embodiment, those skilled in the art will recognize that a single, unified L1 cache may be implemented. In order to minimize data access latency, one or more additional levels of cache memory may be implemented within data processing system 100, such as level two (L2) caches 114 and 116 and level three (L3) caches 118 and 119. The lower cache levels—L2 and L3—are employed to stage data to the L1 caches and typically have progressively larger storage capacities but longer access latencies. For example, data caches 106 and 108 and instruction caches 110 and 112 may each have a storage capacity of 32 KB and an access latency of approximately 1–2 processor cycles. L2 caches 114 and 116 might have a storage capacity of 512 KB but an access latency of 5 processor cycles, while L3 caches 118 and 119 may have a storage capacity of 4 MB but an access latency of greater than 15 processor cycles. L2 caches 114 and 116 and L3 caches 118 and 119 thus serve as intermediate storage between processors 102 and 104 and system memory 120, which typically has a much larger storage capacity but may have an access latency of greater than 50 processor cycles.

Both the number of levels in the cache hierarchy and the cache hierarchy configuration employed in data processing system 100 may vary. L2 caches 114 and 116 in the example shown are dedicated caches connected between their respective processors 102 and 104 and system memory 120 (via system bus 122). L3 caches 118 and 119 are depicted as lookaside caches logically vertical with L2 caches 114 and 116. As a result, data or instructions may be looked up one of L2 caches 114 or 116 and one of L3 caches 118 and 119 simultaneously, although the data or instructions will only be retrieved from L3 cache 118 or 119 if the respective L2 cache 114 or 116 misses while L3 cache 118 or 119 hits. Those skilled in the art will recognize that various permutations of levels and configurations depicted may be implemented.

L2 caches 114 and 116 and L3 caches 118 and 119 are connected to system memory 120 via system bus 122. Also connected to system bus 122 may be a memory mapped device 124, such as a graphics adapter providing a connection for a display (not shown), and input/output (I/O) bus bridge 126. I/O bus bridge 126 couples system bus 122 to I/O bus 128, which may provide connections for I/O devices 130 and nonvolatile memory 132. System bus 122, I/O bus bridge 126, and I/O bus 128 thus form an interconnect coupling the attached devices, for which alternative implementations are known in the art. I/O devices 130 comprise conventional peripheral devices including a keyboard, a graphical pointing device such as a mouse or trackball, a display, and a printer, which are interfaced to I/O bus 128 via conventional adapters. Non-volatile memory 132 may comprise a hard disk drive and stores an operating system and other software controlling operation of system 100, which are loaded into volatile system memory 120 in response to system 100 being powered on. Those skilled in the art will recognize that data processing system 100 may include many additional components not shown in FIG. 1, such as serial and parallel ports, connections to networks or attached devices, a memory controller regulating access to system memory 120, etc. Such modifications and variations are within the spirit and scope of the present invention.

A typical communications transaction on system bus 122 includes a source tag indicating a source of the transaction, a destination tag specifying the intended recipient of the transaction, an address and/or data. Each device connected to system bus 122 preferably snoops all communication transactions on system bus 122, intervening in communications transactions intended for other recipients when necessary and reproducing changes to system memory data duplicated within the device when feasible and appropriate.

Figure 2:
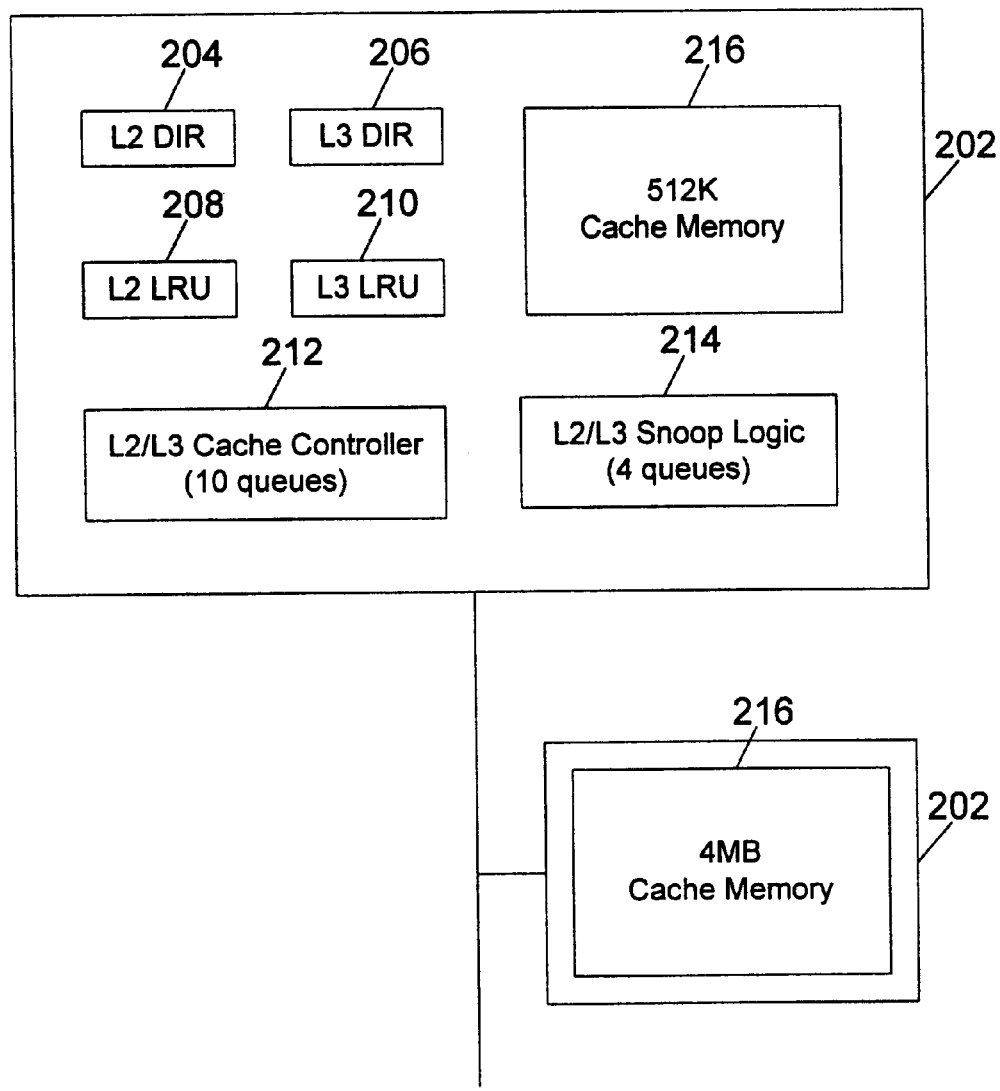
FIG. 2 is a block diagram of a merged vertical cache controller mechanism in accordance with a preferred embodiment of the present invention.

Referring to FIG. 2, a merged vertical cache controller mechanism in accordance with a preferred embodiment of the present invention is illustrated. The example is depicted as implemented for the combination of L2 cache 114 or 116 and L3 cache 118 or 119, although the invention may be implemented for any vertical combination of caches, including the combination of L1 and L2 caches or more than two cache levels. In the merged vertical cache controller mechanism of the present invention, a single integrated circuit device 202 includes both L2 directory (DIR) logic 204 and L3 directory logic 206, as well as L2 LRU unit 208 and L3 LRU unit 210. Device 202 also includes a combined L2/L3 cache controller 212 and combined L2/L3 snoop logic 214. In the depicted embodiment, L2 cache memory 216 is within device 202, while L3 cache memory 218 is implemented within a separate integrated circuit 220 connected to device 202. L2 cache memory 216 may alternatively be implemented within a separate integrated circuit connected to device 202.

Merged L2/L3 cache controller 212 produces an implementation with a single cache controller, but the user sees two vertical levels of cache. Although L2 directory unit 204 is looked up in parallel with L3 directory unit 206, L2 cache 216 and L3 cache 218 are logically in line, such that a miss at L2 cache memory 216 will result in an attempt to access the data in L3 cache memory 218. While the logic required to look up a cache entry in two directories simultaneously instead of only one is slightly more complicated, combined L2/L3 cache controller 212 may be approximately the same physical size as a cache controller for a single cache level. Combined L2/L3 cache controller 212 must cover more cases, but only the same number of state machines, registers, etc. are required. Thus, where separate cache controllers for different levels might be implemented with 10 queues apiece, combined L2/L3 cache controller 212 need only be implemented with 10 queues. The reduction in the total number of required queues reduces the amount of silicon required for implementation.

By looking up cache entries in L2 directory unit 204 and L3 directory unit 206 in parallel, combined L2/L3 cache controller 212 results in faster L3 access if the L2 misses, and faster system memory access if both the L2 and the L3 are missed. For example, if the access latency for the L2 is 5 processor cycles and the access latency for the L3 is 20 cycles, the total latency if the L3 hits and the L2 misses is only 20 cycles rather than 25 cycles as would be required by the prior art. The difference in latency carries over to the total latency to system memory. The merged vertical cache controller mechanism of the present invention thus improves the access latency of both the L3 cache and system memory.

In the merged vertical cache controller mechanism of the present invention, L2 LRU unit 208 and L3 LRU unit 210 may also be updated in parallel. Parallel lookups within L2 directory unit 204 and L3 directory unit 206 provides a means for determining if both the L2 and L3 caches are hit by an attempted access of a specific cache entry, although a hit at the L2 cache obviates the need to complete an access of the L3 cache. Thus, both LRU units 208 and 210 may be updated if both the L2 and the L3 are hit. This provides a more precise least-recently-used replacement policy, since both cache LRU units 208 and 210 are updated when a cache entry contained in both caches is accessed. Alternatively, L3 LRU unit 210 may be updated based on L3 accesses rather than L3 hits. This allows most recently accessed data to be maintained in L2 cache memory 216 while the same data within L3 cache memory 218 is replaced. L3 LRU unit 210 may also be designed to operate in different modes, one in which L3 LRU unit 210 is updated based on L3 directory unit 206 hits and one in which L3 LRU unit 210 is updated based on L3 cache memory 218 accesses. Different software applications may derive different benefits from the two modes of updating L3 LRU unit 210.

As suggested by the above description of updating L3 LRU unit 210 based on L3 cache memory 218 accesses rather than L3 directory unit 206 hits, the merged vertical cache controller mechanism of the present invention does not require L3 cache memory 218 to be inclusive of L2 cache memory 216. Because the same cache entry in both L2 cache memory 216 and L3 cache memory 218 may be replaced in L3 cache memory 218 but not in L2 cache memory 216. While most vertical caches are inclusive, by merging the cache controller for the L2 and L3 caches and by looking up cache entries in L2 and L3 directory units 204 and 206 in parallel, L3 cache memory 218 need not be inclusive of L2 cache memory 216. This improves cache efficiency, since the same cache entry need not be maintained in both cache memories 216 and 218. Therefore the total cache memory is the aggregate of the cache memory space on both levels of the cache hierarchy. Since the L2/L3 cache combinations need not be inclusive, updating L3 LRU unit 210 based on L3 cache memory 218 accesses rather than L3 directory unit 206 hits allows each L2 cache to be optimized for data accessed by the respective local processors while the L3 cache is optimized for additional data accessed by one or both of the processors but not maintained within either L2 cache.

The lack of a necessity for inclusivity also permits the present invention to take advantage of a novel method of deallocating cache blocks while updating caches in lower levels of the hierarchy. Traditionally, cache blocks cast-out from an L2 cache in a multilevel cache hierarchy having additional cache levels are evicted to the L3 cache. In the novel deallocation method, however, on cast-out from an L2 cache, cache blocks are presented on the system bus and resnooped into the L3 cache. Under this method of deallocating L2 cache blocks and updating the L3 cache, L3 cache entries are always S (shared) or I (invalid) under the MESI cache coherency protocol, never M (modified). As a result, error correction code (ECC) checking is not required; simple parity checking may be employed instead, with the cache entry retrieved from memory when a parity error is detected. The deallocation method, which may be utilized independent of the merged cache controller mechanism described herein, is described in greater detail together with attendant advantages in the related application identified above.

Figure 3:
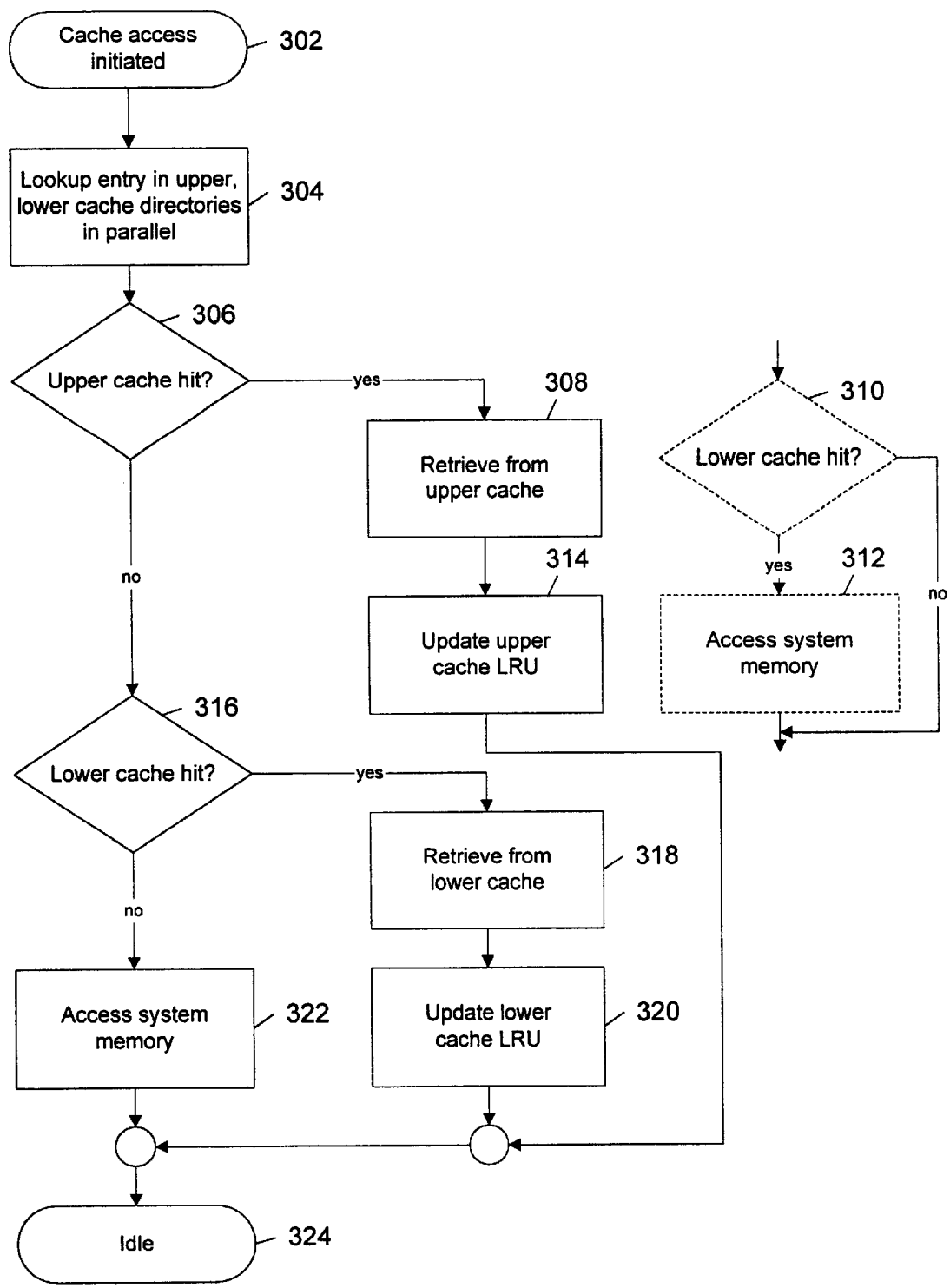
FIG. 3 depicts a high level flowchart of a process for accessing logically in line caches utilizing a merged vertical cache controller mechanism in accordance with a preferred embodiment of the present invention.
Figure 4:
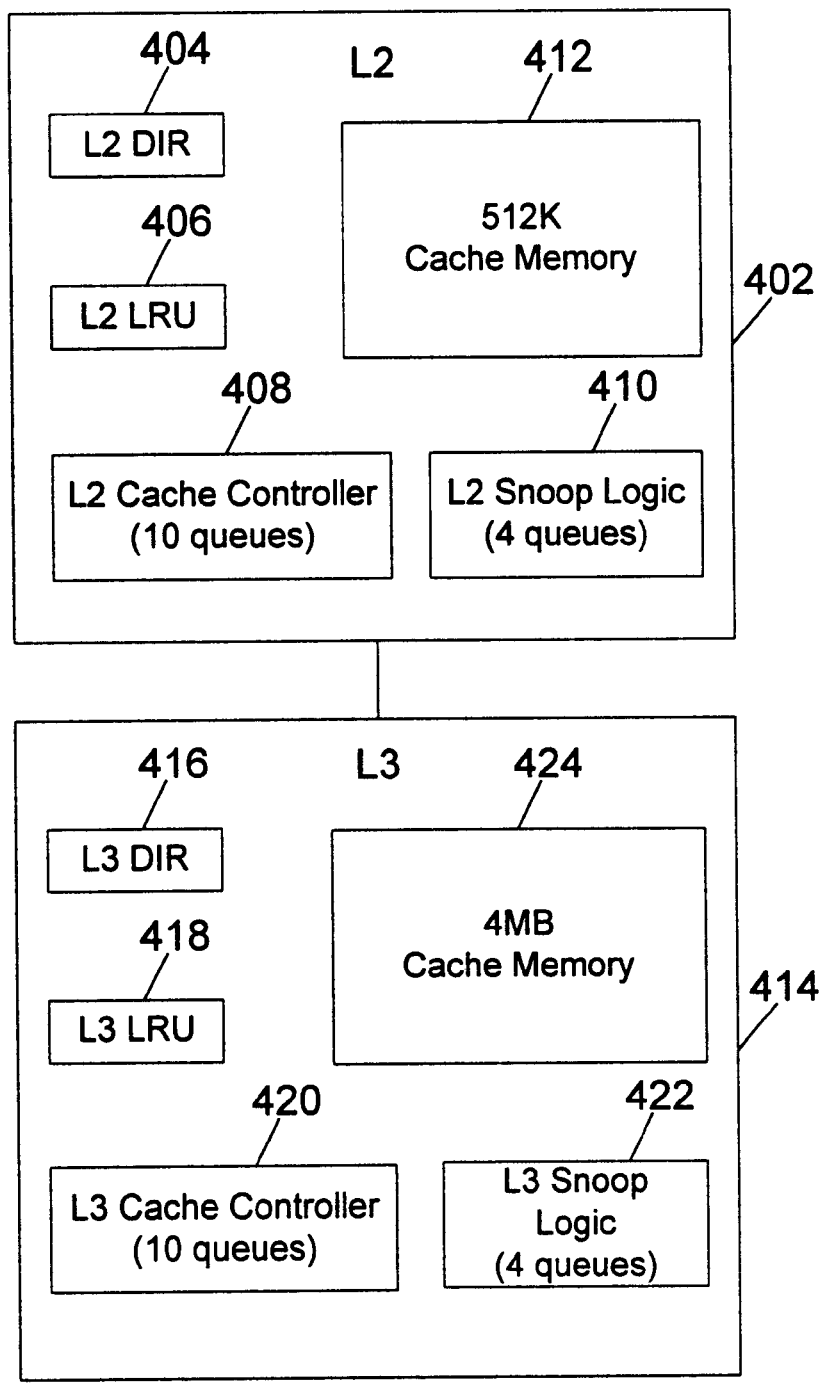
FIG. 4 is a block diagram of a vertical cache hierarchy in accordance with the prior art.

With reference now to FIG. 3, a high level flowchart of a process for accessing logically in line caches utilizing a merged vertical cache controller mechanism in accordance with a preferred embodiment of the present invention is depicted. The process may be implemented within a system having L2 and L3 caches as depicted in FIGS. 1 and 2, or within any system having multiple vertical cache levels with a merged cache controller mechanism in accordance with the present invention. The process begins at step 302, which depicts initiation of a cache access. The process next passes to step 304, which illustrates looking up the desired cache entry in the upper and lower cache directories in parallel, and then to step 306, which depicts a determination of whether the upper cache directory has been hit. If so, the process proceeds to step 308, which illustrates retrieving the desired cache entry from the upper cache, and then to step 314, which illustrates updating the upper cache LRU unit. From step 314, the process passes to step 324, which depicts the process becoming idle until the next cache access is initiated.

If the embodiment of the present invention implemented by the process updates the lower level cache LRU unit based on cache directory hits rather than cache memory accesses, the process may include optional steps 310 and 312 between steps 308 and 314. Step 310 depicts a determination of whether the lower cache has been hit. If so, the process proceeds to step 312, which illustrates updating the lower cache LRU. Otherwise the process proceeds directly to step 314, which is described above. Optional steps 310 and 312 may be omitted to implement an embodiment of the present invention in which the lower cache LRU is updated on cache memory accesses rather than cache directory hits.

Referring again to step 306, if the upper cache directory misses, the process proceeds to step 316, which depicts a determination of whether the lower cache directory has been hit. If so, the process proceeds to step 318, which illustrates retrieving the desired cache entry from the lower cache, and then to step 320, which depicts updating the lower cache LRU. Referring again to step 316, if the lower cache directory misses, the process proceeds instead to step 322, which illustrates accessing the desired data from system memory. From either of steps 320 or 322, the process passes to step 324, which depicts the process becoming idle until a subsequent cache access is initiated.

The present invention provides a vertical cache hierarchy configuration which reduces access latency to lower cache levels within the storage hierarchy and to system memory. The present invention may be implemented within any vertical cache configuration, including an L1 and L2 cache combination, or may be expanded over the exemplary embodiment to operate on multiple levels of a cache hierarchy, such as a merged vertical cache controller mechanism for, and parallel directory lookup of, L1, L2 and L3 caches. Any number and any level of logically in line caches within a multilevel cache hierarchy may be jointly controlled by single cache controller. By combining the cache controller and snoop logic for different levels within the cache hierarchy, separate queues are not required for each level and fewer sets of queues overall are necessary, consuming less silicon area, providing higher frequency operation and improving overall performance. During a cache access, cache directories for all commonly controlled caches are looked up in parallel, with data retrieved from upper caches if hit or from lower caches if the upper caches miss and the lower caches hits. Parallel lookup reduces access latency to the lower caches as well as to system memory if all cache levels miss. Combined cache controller and snoop logic for multiple cache levels also reduces the logic density required. LRU units for all commonly controlled caches may be updated in parallel based on cache directory hits, providing a more precise least-recently-used replacement policy for the total cache space. Alternatively, the lower cache LRU units may be updated based on cache memory accesses rather than cache directory hits, or the cache hierarchy may be provided with user selectable modes of operation for both LRU unit update schemes. The merged vertical cache controller mechanism does not require inclusivity between merged vertical levels of logically in line caches within the cache hierarchy, improving cache efficiency since the same entry need not be stored in multiple levels. A novel deallocation scheme and update protocol may be implemented in conjunction with the merged vertical cache controller mechanism for further performance improvements.

While the invention has been particularly shown and described with reference to a preferred embodiment, it will be understood by those skilled in the art that various changes in form and detail may be made therein without departing from the spirit and scope of the invention.

What is claimed is:

1. A method of retrieving data from a storage hierarchy including first and second logically in line caches and a system memory, comprising:

employing a single cache controller, a single set of cache controller queues and combined snoop logic for accesses by a local processor to both the first and second caches;

concurrently looking up a data item in a first directory for the first cache and in a second directory for the second cache;

responsive to a hit in the first directory, retrieving the data item from the first cache;

responsive to a miss in the first directory and a hit in the second directory, retrieving the data item from the second cache; and responsive to a miss in the first and second directories, retrieving the data item from the system memory.

2. The method of claim 1, further comprising:

responsive to a hit in the first cache directory, concurrently updating an LRU entry for the data item associated with the first cache and an LRU entry for the data item associated with the second cache.

3. The method of claim 1, further comprising:

responsive to a hit in the first cache directory, updating an LRU entry for the data item associated with the first cache without updating an LRU entry for the data item associated with the second cache.

4. The method of claim 1, further comprising:

employing a single set of snoop queues for operations initiated by a remote processor affecting the first cache and for operations initiated by the remote processor affecting the second cache.

5. A cache controller apparatus for first and second logically in line caches within a data processing system, comprising:

first data storage for the first cache having a first LRU unit;

second data storage for the second cache having a second LRU unit wherein content within the second data storage is not inclusive of content within the first data storage;

a single cache controller controlling operation of the first and second caches;

combined snoop logic for the first and second caches;

a first directory for data items within the first data storage;

a second directory for data items within the second data storage; and directory lookup logic looking up a desired data item in the first and second directories concurrently.

6. The apparatus of claim 5, further comprising:

cache controller logic including a single set of queues for accesses to the first and second data storages by a local processor.

7. The apparatus of claim 6, wherein the cache controller logic enqueues a read operation for the first data storage in response to a directory lookup hit in the first directory.

8. The apparatus of claim 6, wherein the cache controller logic enqueues a read operation for the second data storage in response to a directory lookup miss in the first directory and a directory lookup hit in the second directory.

9. The apparatus of claim 5, further comprising:

snoop logic including a single set of queues for operations initiated by a remote processor, the snoop logic enqueuing operations affecting the first data storage and operations affecting the second data storage.

10. The apparatus of claim 5, further comprising:

logic updating the first and second LRU units in response to a directory lookup hit in the first directory.

11. The apparatus of claim 5, further comprising:

logic updating the first LRU unit in response to a directory lookup hit in the first directory without updating the second LRU unit.

12. The apparatus of claim 11, further comprising:

logic updating the second LRU unit in response to a directory lookup miss in the first directory and a directory lookup hit in the second directory.

13. A single integrated circuit implementing a cache controller apparatus for first and second logically in line caches within a data processing system, comprising:

first data storage for the first cache having a first LRU unit;

a first directory for data items within the first data storage;

a second directory for data items within a second data storage outside the integrated circuit, said second data storage including a second LRU unit the second data storage containing data items for the second cache;

combined cache controller logic controlling the operation of both the first and second data storages and including a single set of queues for accesses to the first and second data storages by a local processor;

combined snoop logic snooping operations on a system bus for both the first and second data storages; and directory lookup logic looking up a desired data item in the first and second directories concurrently.

14. The integrated circuit of claim 13, wherein the combined snoop logic includes a single set of queues for operations initiated by a remote processor, the snoop logic enqueuing operations affecting the first data storage and operations affecting the second data storage.

15. The integrated circuit of claim 14, further comprising:

logic updating the first LRU and second LRU unit in response to a directory lookup hit in the first directory.

16. The integrated circuit of claim 14, further comprising:

logic updating the first LRU unit in response to a directory lookup hit in the first directory without updating the second LRU unit; and logic updating the second LRU unit in response to a directory lookup miss in the first directory and a directory lookup hit in the second directory.

* * * * *